United States Patent Office

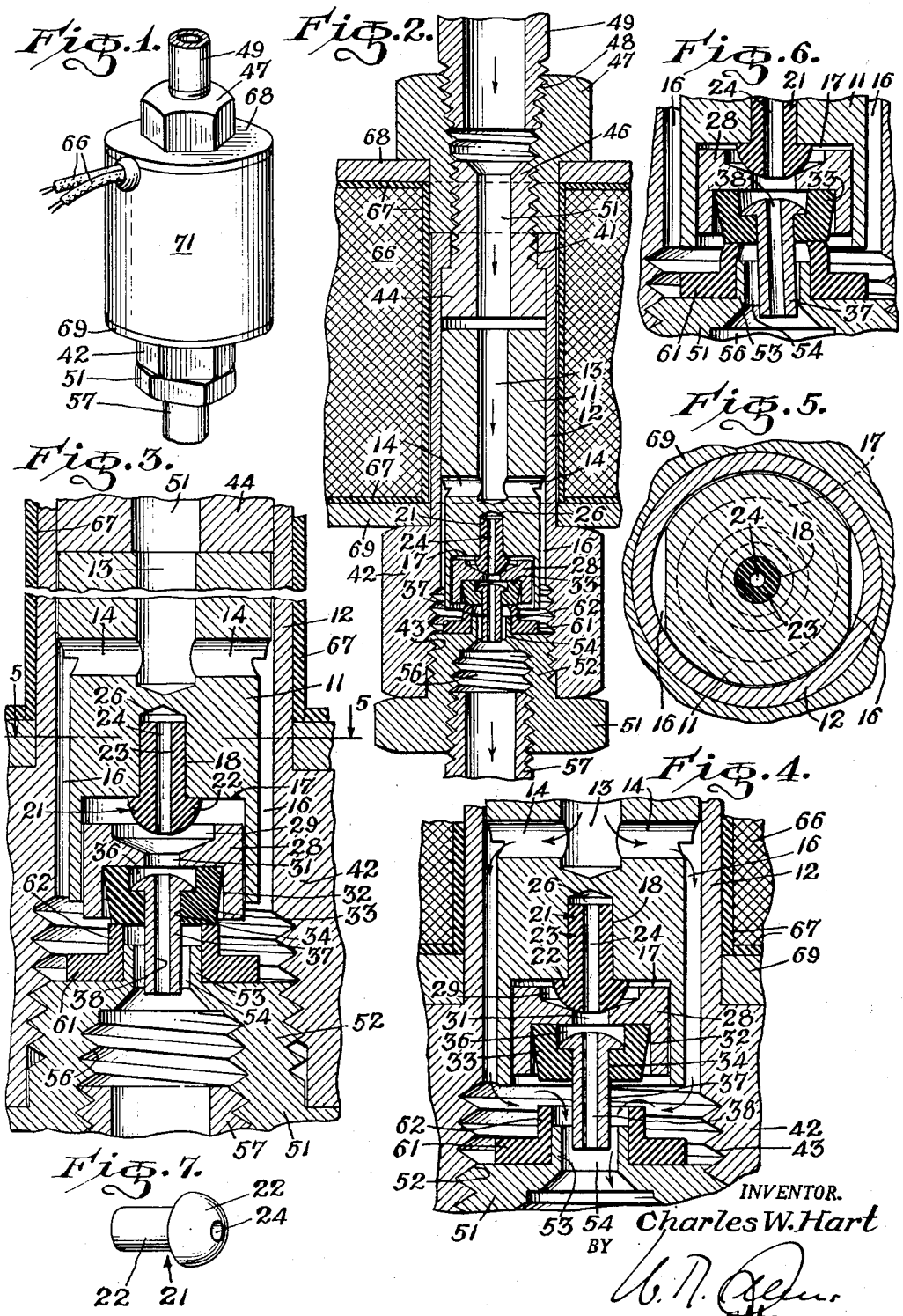

2,693,929
Patented Nov. 9, 1954

2,693,929

SOLENOID-OPERATED VALVE

Charles W. Hart, Alhambra, Calif.

Application May 2, 1951, Serial No. 224,130

18 Claims. (Cl. 251—30)

The present invention relates to valves in general and particularly to a solenoid-operated valve of the "straight through" high pressure type in which the stream of gas or liquid enters at one end of the valve and passes therethrough to discharge from the opposite end. More specifically the invention comprises an improved solenoid-operated valve so constructed and arranged as to require a minimum of electrical current to actuate the valve unit across which relatively high pressure differences exist.

Fluid-controlling valves are of many types and designs and may be actuated manually or by power providing means such as electrical solenoids. Where the pressure difference existing across the valve is relatively great the force required to accomplish valve movement in the conventional valve is also great, being directly proportional to the port area of the valve to be opened and closed. It follows that in those constructions in which electrical windings are used to generate a magnetic field to displace the movable valve element or elements the current required will vary with the power requirement. If the pressure differential across the valve to be controlled can be reduced to a minimum, as by first opening a smaller valve to establish pressure equalization upon its opposite sides, it follows directly that the power required will be reduced with corresponding savings in electrical current and with a reduction in heat losses. It is toward a valve of this type that the present invention is directed.

A principal object of the invention is to provide a solenoid operated valve having improved magnetic field characteristics to effect a material reduction in the electrical current required to provide the actuating power for a valve of given capacity.

A further object of the invention is to provide a valve having improved self-aligning flexible seats which are effectively closed and opened in the presence of misalignment and wear and which materially extend the effective operating life of the valve.

Still another object of the invention is to provide an improved valve in which certain of the resilient valve members are positioned by pressure differentials, thereby eliminating distortion and stress characterizing their retension by conventional mechanical means.

Still another object of the invention is to provide a fluid controlling valve in which the port area of the resilient valve seat is varied with the pressure to which the seat is exposed, thereby reducing the power requirement to open the valve.

A further object of the invention comprises the provision of a fluid controlling valve having resilient flexible seats in combination with operating means to displace them without rupture in the presence of high pressure differences and which utilize the resilient characteristic of the seats to overcome the inertia of the moving parts.

Still another object of the invention is to provide a valve in which a relatively large seat area is used to provide adequate support for a movable flexible valve element and without requiring increased force to effect the opening of the valve and which makes use of pressure differentials to lift the valve progressively and to support it in the absence of positive mechanical securing means.

A still further object of the invention is to provide a displaceable valve unit in which the valve proper is efficiently retained in place during the opening travel by pressure differences and in the absence of positive mechanical retention means.

A further object of the invention is to provide a solenoid operated valve in which movable valve elements are incorporated in the actuated armature and in which seating elements are retained in a new and novel manner.

Another object of the invention is to provide a solenoid operated valve unit in which a thin-walled brass tube separates the magnetic field solenoid winding from the movable armature which it actuates.

A further object of the invention is to provide a novel valve incorporating resilient seats capable of self alignment to compensate for wear, distortion or misalignment.

A further object of the invention is to provide a new and novel electromagnetically operated valve in which a magnetically actuated plunger is slidably positioned within a thin-walled chamber of non-magnetic material constructed and mounted as to provide maximum magnetic flux efficiency.

A still further object of the invention resides in the provision of a valve in which resilient valve seats are retained in position in movable valve elements by pressure differentials rather than mechanically.

Still another object of the invention resides in the provision of a valve in which the port area of a resilient valve seat is automatically reduced by the compression of the valve seat under pressure, the port returning to its normal maximum area upon the equalization of the pressure upon all sides of the valve seat.

Still another object of the invention comprises a new and novel magnetically operated valve in which the movable valve elements are carried by a magnetically actuated plunger in which they are assembled as a unit to provide maximum compactness and efficiency.

Still another object of the invention comprises a compound valve construction in which a principal valve is opened with a minimum force requirement as a result of the initial opening of a secondary smaller valve.

A further object of the invention comprises a magnetically operated valve in which a movable plunger floatingly carries the movable elements of a compound valve.

Resilient valve seats have been used in prior valve constructions but their use has been limited in large part to low pressure work because of the tensile weakness of the resilient material which causes it to tear or to be permanently deformed when opening high pressures and when mechanically secured to a movable element of the valve. A simple and well-known type of valve making use of a semi-resilient seat comprises the valve of the common water faucet in which a center screw, or similar mechanical means, retains a resilient seat in the movable carrier element, the seat being designed to close against an initial pressure. Such a valve can readily open without rupture or distortion because the pressure functions to assist the valve opening. The useful life of such seats, however, is relatively short if the pressure relationship is reversed and the valve is opened against the pressure. Difficulties are encountered in that the projection of the resilient seat extends beyond the limits of the carrying means which provides insufficient support so that where the pressure is great the force exceeds the tensile strength of the seat and tearing results.

In the improved valve constructed in accordance with the present invention no mechanical means are used to retain the resilient valve seat in place, but instead use is made of pressure differential existing within the valve construction to retain the seat in its position and to support the valve as to prevent tearing and rupture. The elimination of mechanical connections between the resilient valve seat and its carrying element is of greatest importance and insures increased effective valve life.

Referring now to the drawings in which a preferred embodiment of the invention is illustrated:

Figure 1 is a view in perspective of a magnetically operated valve unit constructed in accordance with the present invention;

Figure 2 is an enlarged vertical cross-section through the valve of Figure 1, the working parts being shown in operative closed position;

Figure 3 is an enlargement of the lower end of the section of Figure 2 and shows the relationship of the parts with the valve closed but with static pressure equalized upon all sides of the valve seats;

Figure 4 is a section similar to Figures 2 and 3 but with the valve parts shown in their open relationship in which they are positioned with a fluid passing through the valve under operating pressure.

Figure 5 is a transverse section upon the line 5—5 of Figure 3;

Figure 6 is an enlarged fragmentary vertical cross-section through a similar valve construction in which the valve seats are shown as misaligned and are illustrated in their closed position in which they compensate for this defect; and Figure 7 is an enlarged view in perspective of the novel plunger-carried resilient ball-type valve seat.

The valve unit constructed in accordance with the present invention includes a magnetically actuated plunger or armature, indicated by the reference character 11, which is slidably positioned within an enclosing chamber or cylinder 12 of greater length. Plunger 11 may be cylindrical and is formed of magnetic material as to be responsive to a magnetic field created by a surrounding electrical winding later to be described. It is bored for a portion of its length from one end by a longitudinal bore 13 which opens into a transverse bore 14 the ends of which terminate at flattened shoulders on the sides of the plunger extending to its opposite end to form with the enclosing cylinder 12 a pair of circumferentially spaced channels 16.

The opposite end of the plunger is recessed and counterdrilled to form an enclosed seat 17 for a floating piston and a smaller centrally positioned seat 18 for a resilient ball-type valve seat 21. The floating piston unit will hereinafter be described in detail. The resilient ball-headed valve seat 21 is seen in the various figures, and particularly in Figure 7, to comprise a semi-spherical head 22 from which extends a cylindrical body 23 of smaller diameter, an elongated conduit or bore 24 extending the length of the entire element 21 to form a passage leading to the chamber or pocket 26 which is formed at its end within its seat 18 by virtue of its length being less than the seat length. The shoulder between the semi-spherical head 22 and the cylindrical body 23 abuts the flat surface of the end of the recess 17 in the plunger, as is clearly shown in the various views, Figure 3 for example.

The valve piston unit slidingly positioned within the counterbored end 17 of the plunger 11 comprises a slidable rigid metallic element or piston 28 positioned slidingly within its seat 17 in the plunger. In a preferred form both are circular in section but the exact exterior configuration is not of the essence so long as the piston seats slidingly within the plunger and its fit therein is sufficiently loose that fluid under pressure can pass therebetween and into the space or chamber between the inner end of the piston and the opposed face of the plunger. On its inner side facing the ball-type seat member 21 piston 28 is centrally counterbored at 29 to provide a conical valve seat so dimensioned relative to the size of the semi-spherical head 22 of the element 21 that the latter is adapted to abut thereagainst and make sealing contact therewith when the valve piston and the plunger are forced together. A central passage or conduit 31 connects the seat 29 with an enlarged recess 32 in the opposite side of the piston 28. Recess 32 is considerably larger than valve seat 29 and slidingly encloses and seats a resilient seat element 33. The latter is exteriorly frusto-conical as to enable it to tilt and change its angular position within the recess 32 and is provided with flat end surfaces which on one side abut the inner face of the recess 32. Element 33 is formed with a central bore 34 and with an enlarged counterbore 36 at its inner end which seats the enlarged rounded end of an elongated tubular element 37 through which extends a central bore or passage 38. Movable valve piston 28 is in reality formed with two valve seats, an integral rigid and metallic valve seat 29 and a resilient relatively movable seat 33. The former is adapted to cooperate with and be sealed by the ball-type resilient seat 21 carried by the plunger. Resilient seat member 33 is adapted to cooperate with and close another resilient seat fixed to the exit end of the chamber 12 in a manner to be described.

Turning now to the chamber or cylinder 12 which slidingly encloses the plunger 11 and also the floating piston valve unit carried thereby, that very important member is seen to comprise a thin-walled element which at its opposite ends is formed, respectively, with an internal enlarged shoulder or collar 41 and with an external thick-walled enlargement 42 provided with a tapered threaded internal bore 43. The inlet end of the chamber 12 is formed by the internal collar 41, the inner face of which lies in a plane at right angles to the longitudinal axis of the cylinder, and is closed by a steel magnetic plug 44 the enlarged head of which makes a tight slidable fit within the cylinder 12 and the smaller threaded body 46 of which extends through the collar 41. The threaded body 46 of plug 44 seats an interiorly threaded nut 47 the outer extremity of which is interiorly threaded on a taper, as at 48, with pipe threads suitable to seat the threaded end of an inlet pipe 49. A bore or passage 51 extends longitudinally through the plug 44 and serves as a conduit into the cylinder 12 for fluid under pressure received from inlet pipe 49. The tightening of the nut 47 upon the plug body 46 draws the head of the plug 44 into tight sealing contact with the square shoulder of the collar 41 to provide a pressure-tight seal. The inner end of the nut 47 abuts the adjacent end of the chamber or cylinder 12, as is clearly illustrated in Figure 2, and as it is tightened on the threaded body 46 of the plug 44 it is clear that the latter will be drawn tightly against the collar 41.

The opposite end of cylinder or chamber 12, that formed by the exterior enlargement 42, seats an exit plug 51 which, in addition to being formed with a head in the manner of the usual plug and an exteriorly threaded body 52, the latter seating in sealed relationship in the interiorly threaded end of enlargement 42 of cylinder 12, is formed at its flat inner end with a cylindrical wall or collar 53 which forms a port or passage 54 opening into an enlarged threaded central bore 56 which extends through the plug and which seats the discharge conduit or pipe 57. As is clearly illustrated in Figures 2, 3, 4 and 6, a resilient valve seat 61 resiliently and frictionally seats upon the collar 53, its flat base abutting the flat end of the plug 51 while its tubular body 62 extends into the cylinder 12 beyond the end of the supporting collar 53 and forms an extension of the port 54. It is this cylindrical tubular body portion 62 of the resilient valve seat 61 which is contacted by the flat end face of the resilient valve seat 33 of the piston unit to be sealed by the latter, a relationship illustrated in Figure 2. In Figure 3 the piston resilient valve seat 33 is shown merely resting upon the resilient valve seat 34, but in Figure 2 the two are shown in engagement as under actual operating conditions with pressure present and the valve functioning to prevent the flow of fluid under pressure through the valve.

The power providing unit for the valve constructed in accordance with the present invention includes an encircling current-carrying coil 66 positioned concentrically around the thin-walled non-magnetic cylinder or chamber 12 and spaced by insulating walls 67 from that cylinder and the adjacent nut 47 as well as from the top and bottom plates 68 and 69, respectively, of its own casing. The coil 66 is enclosed by a metallic cylinder 71 through which the extremities of the current-carrying coils, indicated at 66 in Figure 1, extend. The lower casing plate 69 rests upon the shoulder formed by the enlargement 42 of the chamber 12 while the upper plate 68 is abutted and forced toward the lower plate by the head of the nut 47. With the latter in place upon the plug 44 it performs not only the function of tightening the plug into fluid-tight relationship with respect to the cylinder 12 by drawing it against the collar 41 but also the function of clamping the coil 66 and its metallic casing in place with respect to the chamber.

The valve constructed in accordance with the present invention is adapted to control the flow of a fluid, either a liquid or a gas, at a relatively high pressure running into the hundreds of pounds. The unit need not be positioned in any particular angular relationship although illustrated in the drawing with its longitudinal axis vertical. The unit is intended to be held in its closed position by fluid pressure and in its open position magnetically. Let it be assumed that the unit is connected in the line of a fluid under pressure, by the inlet pipe 49 and by the discharge or outlet pipe 57. Let it also be assumed that the pressure has not yet been made available and the parts have taken the relative positions illustrated in Figure 3. Upon the fluid under pressure being made available it enters through the inlet pipe 49 and makes its way through the passage 51 in plug 44 to the interior of the piston chamber 12. The frictional force of the inrushing fluid on the plunger 11 forces that member toward the opposite end of cylinder 12 and moves the resilient ball-type valve seat member 21 which it carries into abutting sealing contact with the conical seat 29 of the valve piston 28 and forces the latter, and particularly its resilient deformable seat 33, into sealing contact with the tubular body 62 of resilient seat 61 carried by the discharge plug 51. The fluid under pressure makes its way through the passages 13, 14 and 16, the latter being along the sides of the plunger 11 and between it and the enclosing cylinder 12, and inlet pressure is then present at the discharge end of the cylinder 12 and upon the exterior surfaces of the resilient valve seat members 33 and 61. The former is forced into tight sealing contact at its flat upper end against the inner surface of its recessed seat 32 in valve piston member 28 while the latter under the pressure of the fluid surrounding it and pressure of the seating member 33 acting against it is deformed from its normal circular or cylindrical shape, shown in Figure 3, and is deflected, compressed and deformed inwardly, as shown in Figure 2, in which its interior cross-sectional area is reduced. The pressure existing within the outlet pipe 57, the passage 56 and port 54 is present in the interior of the resilient valve seat 61. The same pressure is present in the passage 38, in tubular element 37, in the chamber 36 in seat 33, in the passage 31 of piston 28, and in the conical valve seat 29 which is sealed to the semi-spherical ball-type resilient valve element 21. The central passage 24 of the latter connects directly to the chamber or pocket 26 at its upper end and the same pressure is present there. It is seen that interiorly the valve seats and piston are at exhaust pressure, which may be atmospheric, while exteriorly they are exposed to the inlet pressure. The inlet fluid pressure is exposed to a greater projected area of the movable parts upon the inlet side of the chamber than upon the outlet side; as a part of the projected area on the latter side is exposed to the outlet or exhaust pressure. As a result the total force acting against the movable parts tending to move them toward the outlet port exceeds the total force acting in the opposite direction, the inlet pressure being greater than the outlet pressure, and the movable parts are held in the valve closed position which they initially assumed under the frictional force of the inrushing fluid. No fluid flows through the unit and the high pressure, while present within the interior of the chamber 12 and around the resilient valve elements 33 and 61, and even inside the counterbored recess 17 in the plunger, having passed between the valve piston 28 and that recess, there is no flow into the interior low pressure passages for the various seating elements are in sealing contact.

Let it now be assumed that it is desired to open the valve to permit the flow of fluid from the high pressure side to the low pressure side. To open the passage in valve seat 61 directly would require a relatively large force, for the pressure tending to hold the valve seat 33 in sealed relationship to the valve seat 62 is equal to the pressure differential existing between the high and low pressure sides multiplied by the area of the port to be opened. While the area of the interior of the valve seat 61 has been reduced by its deformation as described, the conformation, being illustrated in Figure 2, yet the required force would be relatively great, much greater, for example, than the force required to separate the valve seats 21 and 29.

To accomplish the opening the winding 66 is energized and electric current flows through it under the control of suitable means forming no part of the present invention. Immediately a magnetic flux is created by the winding 66 which flows through the casing 71, end plates 68 and 69, directly to the connected nut 47 and through it to the plug 46 which acts as a magnetic pole to draw the plunger 11 toward it. As the plunger 11 moves toward the plug 46 it might be thought that it would move from the resilient ball-type seat 21 and from the resilient seat 33, both of which are loosely seated, but this is not the case. The exhaust pressure, which may be atmospheric, is present within the pocket 26 at the inner end of ball-type seat 21 while the greater inlet pressure is present upon the exterior surfaces of its semi-spherical head 22. The latter forces the head against the inner face of the recess 17 and as the plunger moves toward the plug 46 the ball seat element moves with it and gradually breaks its contact with the rigid integral seat 29 of the valve piston 28. The break in the seal is not instantaneous but instead, as the ball-type seating element 21 moves from the seat 29, the line of contact in fact peels away in a continuously contracting circle until finally the point of contact breaks at a minimum diameter. The high inlet pressure has at all times been present within the recess 17 around the piston member 28 and the ball-type valve 21 and has to this point exerted pressure to force the floating piston member 28 downwardly on its resilient seat member 61 carried by the plug 51. Upon the separation of the resilient seat 21 from the seat 29, however, the reduced outlet pressure is available immediately through the seat 29 and into the chamber in the recess 17 formed between the piston and the recess end wall. At this time, and for the first time, the pressure acting upon the lower or exhaust end of the piston member 28, which is inlet pressure, exceeds the pressure acting upon the inner end thereof within the recess 17, and that member moves in the same direction as the plunger 11. In this connection it is important that the area of the clearance between the piston 28 and the recess 17 should be less than the minimum area of the passages connecting the recess 17 through the valve seat 29 to the discharge port 54. If this is not the case the inlet pressure would be enabled to build up within the recess 17 and adjacent the inner end of piston 28 and the latter would not move toward the plunger as described. It might also be thought that the resilient valve seat 33 would remain in contact with its cooperating seat 61 as the piston member 28 moves toward the plunger, particularly in view of the fact that it has a free sliding fit within its seat 32 in the piston. Such is not the case, however, for the pressure acting upon the exterior face of the member 33 comprises fluid at the inlet pressure while within the recess 36 the pressure is substantially outlet or atmospheric pressure. Accordingly the pressure tending to hold the resilient seat member 33 in the valve piston 28 causes that member to move with the valve piston whereupon it breaks its sealing contact with the circular wall 62 of the resilient seat 61 and the fluid under pressure from the inlet is free to flow directly through the outlet port 54 and pass into the outlet pipe 57.

At no time was it necessary to open the sealing contact between the valve seats 33 and 61 with the full pressure differential thereacross. The relative movement between the parts took place in the absence of fixed mechanical connections between the resilient valve seats and the metallic members in which they are mounted. The conjoint movement of the valve seats and the elements in which they are mounted was accomplished by virtue of pressure differentials present thereby eliminating permanent deformation and tearing action which characterizes the usual conventional construction.

The construction comprising the present invention is particularly useful in that in the event of wear or misalignment in the resilient seating elements 62 or 33 they are inherently able to take care of the situation without difficulty. Reference being made to Figure 6, there is illustrated a situation in which the valve element 61 has become worn at the upper end of the circular wall 62 so that in order to seat in sealing relationship thereon it is necessary for the resilient seat member 33 of the piston member 28 to tilt within its seat 32 in that member. This it is capable of doing without difficulty, the rigid tubular element 37 being somewhat tilted with respect to the collar 53 through which it extends but encountering no difficulty in so doing.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a pressure closed valve of the type in which a resilient ported seat is closed by a movable closure unit; a resilient valve seat including a deformable integral collar defining a fluid port, the wall of said collar being sufficiently flexible as to enable said collar to be compressed radially inward under the pressure exerted upon it in operation by a surrounding fluid under pressure and by a closure unit contacting its open end; and a movable closure unit adapted to move toward and from the open end of the collar of said resilient seat, said unit including a rigid body formed in its side opposite said collar with a recess, and a second resilient seat flat on its side facing said collar positioned in said recess with its side wall loosely fitted in said recess in order that said second resilient seat may adjust itself angularly to accommodate misalignment or wear at said collar.

2. In a pressure closed valve of the type in which a resilient ported seat is closed by a movable closure unit; a resilient valve seat including a deformable integral collar defining a fluid port, the wall of said collar being sufficiently flexible as to enable said collar to be compressed radially inward under the pressure exerted upon it in operation by a surrounding fluid under pressure and by a closure unit contacting its open end; and a movable closure unit adapted to move toward and from the open end of the collar of said resilient seat, said unit including a rigid body formed in its side opposite said collar with a recess and a second resilient seat loosely positioned in said recess and facing said collar, the surface of said second resilient seat being contoured to make sealing contact with the end of said collar, said rigid body and said second resilient seat being formed with fluid-conducting passages which interconnect through the said recess.

3. In a pressure closed valve of the type in which a resilient ported seat is closed by a movable closure unit; a resilient valve seat including a deformable integral collar defining a fluid port, the wall of said collar being sufficiently flexible as to enable said collar to be compressed radially inward under the pressure exerted upon it in operation by a surrounding fluid under pressure and by a closure unit contacting its open end; and a movable closure unit adapted to move toward and from the open end of the collar of said resilient seat, said unit including a rigid body formed in its side opposite said collar with a recess and a second resilient seat loosely positioned in said recess and facing said collar, the surface of said second resilient seat being contoured to make sealing contact with the end of said collar, said rigid body and said second resilient seat being formed with fluid-conducting passages which interconnect through the said recess, the passage in said second resilient seat including a tube which extends from said seat and of a length sufficient to extend into the port formed by said collar for the purpose of making the pressure in said port available through said second resilient seat and said rigid body.

4. The construction recited in claim 3 characterized in that the passage in said rigid body terminates in a valve seat.

5. In a pressure closed valve of the type in which a resilient ported seat is closed by a movable closure unit; a resilient valve seat including a deformable integral collar defining a fluid port, the wall of said collar being sufficiently flexible as to enable said collar to be compressed radially inward under the pressure exerted upon it in operation by a surrounding fluid under pressure and by a closure unit contacting its open end; and a movable closure unit adapted to move toward and from the open end of the collar of said resilient seat, said unit including a rigid body formed in its side spaced from said collar with a valve seat, on its side opposite said collar with a recess, and with a passage connecting said valve seat and said recess, said movable unit also including a second resilient seat tiltably positioned in the recess in said rigid body and having a face to abut the open end of said collar, said second resilient seat being formed with a passage to connect the port in said collar to the passage in said rigid body and therethrough to said valve seat in said rigid body.

6. In a pressure closed valve of the type in which a resilient ported seat is closed by a movable closure unit; a resilient valve seat including a deformable integral collar defining a fluid port, the wall of said collar being sufficiently flexible as to enable said collar to be compressed radially inward under the presure exerted upon it in operation by a surrounding fluid under pressure and by a closure unit contacting its open end; a movable closure unit adapted to move toward and from the open end of the collar of said resilient seat, said unit including a rigid body formed in its side spaced from said collar with a valve seat, on its side opposite said collar with a recess, and with a passage connecting said valve seat and said recess, said movable unit also including a second resilient seat tiltably positioned in the recess in said rigid body and having a face to abut the open end of said collar, said second resilient seat being formed with a passage to connect the port in said collar to the passage in said rigid body and therethrough to said valve seat in said rigid body, and a unit adapted to be selectively actuated by an exterior force to control the movement of said closure unit relative to said resilient valve seat and including a rigid plunger and a third resilient valve seat positioned as to seat upon the valve seat in the rigid body of said closure unit to close the said passage therein, said third resilient valve seat being ported to transmit pressure from said passage in said rigid body to a wall portion of said plunger.

7. In a pressure closed valve of the type in which a resilient ported seat is closed by a movable closure unit; a resilient valve seat including a deformable integral collar defining a fluid port, the wall of said collar being sufficiently flexible as to enable said collar to be compressed radially inward under the pressure exerted upon it in operation by a surrounding fluid under pressure and by a closure unit contacting its open end; a movable closure unit adapted to move toward and from the open end of the collar of said resilient seat, said unit including a rigid body formed in its side spaced from said collar with a valve seat, on its side opposite said collar with a recess, and with a passage connecting said valve seat and said recess, said movable unit also including a second resilient seat tiltably positioned in the recess in said rigid body and having a face to abut the open end of said collar, said second resilient seat being formed with a passage to connect the port in said collar to the passage in said rigid body and therethrough to said valve seat in said rigid body; and a unit to control the movement of said closure unit relative to said resilient valve seat adapted to be displaced by a force supplied from the exterior, said unit including a rigid body formed with recessed end slidably enclosing said movable closure unit, and a third resilient valve seat carried in said recessed end in position to seat upon the valve seat in the rigid body of said closure unit to close said passage therein.

8. The construction recited in claim 7 characterized in that the third resilient valve seat carried in the recessed end of the rigid body of said actuating unit is formed with a passage which opens to the passage in the rigid body of said closure unit with said third resilient valve seat closed upon the valve seat in the body of said closure unit for the purpose of making available at the inner end of said third resilient valve seat the pressure within the passage in the rigid body of said closure unit.

9. In a pressure closed valve of the type in which a resilient ported seat is closed by a movable closure unit; a cylinder having inlet and outlet ports; a resilient valve seat including a deformable integral collar defining said outlet port, the wall of said collar being sufficiently flexible as to enable said collar to be compressed radially inward under the pressure exerted upon it in operation by a surrounding fluid under pressure and by a closure unit contacting its open end; a movable closure unit adapted to move toward and from the open end of the collar of said resilient seat, said unit including a rigid body formed in its side opposite said collar with a recess and a second resilient seat flat on its side facing said collar positioned in said recess with its side wall loosely fitted in said recess in order that said second resilient seat may adjust itself angularly to accommodate misalignment or wear at said collar; and a unit to control the movement of said closure unit relative to said resilient valve seat adapted to be positioned by an outside force, said unit including a rigid body forming a plunger slidably positioned in said cylinder for movement toward and from said outlet port and itself slidably enclosing said closure unit and adapted upon movement toward said outlet port to force said second resilient seat against said collar.

10. In a pressure closed valve of the type in which a resilient ported seat is closed by a movable closure unit; a cylinder having inlet and outlet ports; a resilient valve seat including a deformable integral collar defining said outlet port, the wall of said collar being sufficiently flexible as to enable said collar to be compressed radially inward under the pressure exerted upon it in operation by a surrounding fluid under pressure and by a closure unit contacting its open end; a movable closure unit adapted to move toward and from the open end of the collar of said resilient seat, said unit including a rigid body formed in its side opposite said collar with a recess and a second resilient seat flat on its side facing said collar positioned in said recess with its side wall loosely fitted in said recess in order that said second resilient seat may adjust itself angularly to accommodate misalignment or wear at said collar; a unit to control the movement of said closure unit relative to said resilient valve seat adapted itself to be positioned by a force supplied from the exterior of said valve, said unit including a rigid body forming a plunger slidably positioned in said cylinder for movement toward and from said outlet port and itself slidably enclosing said closure unit and adapted upon movement toward said outlet port to force said second resilient seat against said collar.

11. In a pressure closed valve of the type in which a resilient ported seat is closed by a movable closure unit; a cylinder having inlet and outlet ports; a resilient valve seat including a deformable integral collar defining said outlet port, the wall of said collar being sufficiently flexible as to enable said collar to be compressed radially inward under the pressure exerted upon it in operation by a surrounding fluid under pressure and by a closure unit contacting its open end, a movable closure unit adapted to move toward and from the open end of the collar of said resilient seat, said unit including a rigid body formed in its side opposite said collar with a recess and a second resilient seat flat on its side facing said collar positioned in said recess with its side wall loosely fitted in said recess in order that said second resilient seat may adjust itself angularly to accommodate misalignment or wear at said collar; and a unit to control the movement of said closure unit relative to said resilient valve seat adapted itself to be actuated by an exteriorly supplied force, said unit including a rigid body forming a plunger positioned in said cylinder between said ports for movement toward and from said outlet port, said plunger slidably enclosing said closure unit and adapted upon movement toward said outlet port to force said second resilient seat against said collar, said plunger being formed with a passage extending from its end nearest said inlet port and opening to a passage formed between the side of said plunger and said cylinder which connects to the end of said cylinder housing said outlet port, said passages through said plunger and between said plunger and said cylinder being adapted to direct fluid under pressure into said end of said cylinder housing said outlet port.

12. In a pressure closed valve of the type in which a resilient ported seat is closed by a movable closure unit; a cylinder having open ends, bored plugs seated in said open ends forming inlet and outlet ports, said inlet plug being formed of magnetic material, a resilient valve seat including a deformable integral collar defining said outlet port, the wall of said collar being sufficiently flexible as to enable said collar to be compressed radially inward under the pressure exerted upon it in operation by a surrounding fluid under pressure and by a closure unit contacting its open end; a movable closure unit adapted to move toward and from the open end of the collar of said resilient seat, said unit including a rigid body formed in its side opposite said collar with a recess and a second resilient seat flat on its side facing said collar positioned in said recess with its side wall loosely fitted in said recess in order that said second resilient seat may adjust itself angularly to accommodate misalignment or wear at said collar; and a unit to control the movement of said closure unit relative to said resilient valve seat adapted itself to be positioned by a force supplied from the exterior, said unit including a rigid body forming a plunger slidably positioned in said cylinder for movement toward and from said outlet port and itself slidably enclosing said closure unit and adapted upon movement toward said outlet port to force said second resilient seat against said collar.

13. The construction of claim 12 characterized in that said cylinder is thin-walled, of non-magnetic metal, and formed interiorly at one end with an internal shoulder, and in that said inlet plug includes an enlarged head positioned inside said cylinder in abutting sealing contact with said internal shoulder and a threaded shank extended therethrough to the exterior of said cylinder where it is adapted to seat a retaining clamping nut.

14. The construction of claim 12 characterized in that said cylinder is thin-walled, of non-magnetic material, and formed at one end with a circular internal shoulder and at its opposite end with a thickened end portion forming a shoulder facing toward the end including said internal shoulder, said inlet plug being formed with an enlarged head positioned inside said cylinder in abutting sealing contact with said internal shoulder and with a threaded shank extended through said internal shoulder and exteriorly of said cylinder, and an internally threaded nut is seated on the shank of said inlet plug to draw the latter into sealing engagement with said internal shoulder.

15. The construction recited in claim 13 characterized in that said nut is also of magnetic material and in that the mass of said inlet plug and said nut seated thereon is relatively great as compared to the mass of said thin-walled cylinder whereby a path of minimum reluctance is provided for the magnetic flux at the end of said cylinder to improve the operating characteristics of the valve.

16. In a pressure closed valve having inlet and outlet fluid passages, a first valve seat encompassing said outlet passage, a plunger movable toward and away from said first valve seat and adapted to be surrounded by fluid at inlet pressure, said plunger having a first recess in its end adjacent said first valve seat and a second recess in the bottom wall of said first recess, a second valve seat encompassing the mouth of said second recess, and a movable closure unit loosely mounted in said first recess and adapted to seat both on said first valve seat and on said second valve seat, said closure unit being provided with passage means effecting communication between the bottom of said second recess and said outlet passage when said closure unit is seated relative to both of said valve seats.

17. The invention as claimed in claim 16, wherein said plunger is a magnetizable member disposed in the central opening of a solenoid, and a magnetizable plug is mounted in the end of said central opening remote from said first valve seat, said plug acting as a seal and as a magnetic pole to draw said plunger away from said first valve seat upon energization of said solenoid.

18. The invention as claimed in claim 16, wherein said second valve seat is an elastomeric hemispherical element provided with an aperture to effect communication between the bottom of said second recess and said passage means in said closure unit.

References Cited in the file of this patent

UNITED STATES PATENTS

| Number | Name | Date |
|---|---|---|
| 554,455 | McKay | Feb. 11, 1896 |
| 1,183,981 | Johnson | May 23, 1916 |
| 1,203,766 | Miller | Nov. 7, 1916 |
| 1,634,512 | Pyne | July 5, 1927 |
| 1,704,151 | Simpson | Mar. 5, 1929 |
| 1,793,252 | Roth | Feb. 17, 1931 |
| 2,251,441 | Dillman | Aug. 5, 1941 |
| 2,279,243 | Parsons | Apr. 7, 1942 |
| 2,376,402 | Svirsky | May 22, 1945 |
| 2,403,777 | Yanka | July 9, 1946 |
| 2,562,392 | Ray | July 31, 1951 |
| 2,619,112 | Renick | Nov. 25, 1952 |
| 2,619,116 | Ralston | Nov. 25, 1952 |